United States Patent
Zhang

(10) Patent No.: US 11,706,022 B1
(45) Date of Patent: Jul. 18, 2023

(54) METHOD FOR TRUSTED DATA DECRYPTION BASED ON PRIVACY-PRESERVING COMPUTATION

(71) Applicant: Nanhu Laboratory, Jiaxing (CN)

(72) Inventor: Lei Zhang, Jiaxing (CN)

(73) Assignee: Nanhu Laboratory, Jiaxing (CN)

( * ) Notice: Subject to any disclaimer, the term of this patent is extended or adjusted under 35 U.S.C. 154(b) by 0 days.

(21) Appl. No.: 18/154,506

(22) Filed: Jan. 13, 2023

(30) Foreign Application Priority Data

Apr. 25, 2022 (CN) .......................... 202210437790.4

(51) Int. Cl.
*H04L 9/08* (2006.01)
*H04L 9/32* (2006.01)

(52) U.S. Cl.
CPC .......... *H04L 9/0825* (2013.01); *H04L 9/3213* (2013.01); *H04L 9/3247* (2013.01)

(58) Field of Classification Search
CPC .... H04L 9/0825; H04L 9/3213; H04L 9/3247
See application file for complete search history.

(56) References Cited

U.S. PATENT DOCUMENTS

| | | | | |
|---|---|---|---|---|
| 10,873,568 | B2* | 12/2020 | Williams | G06F 16/90335 |
| 11,366,921 | B2* | 6/2022 | Lahav | H04L 9/0822 |
| 11,403,420 | B2* | 8/2022 | Ren | G06F 16/9027 |
| 2019/0116038 | A1* | 4/2019 | Sprague | H04L 9/3226 |
| 2019/0327088 | A1* | 10/2019 | Camenisch | H04L 9/14 |
| 2020/0028693 | A1* | 1/2020 | Wu | H04L 9/3263 |
| 2020/0128022 | A1* | 4/2020 | Bleikertz | H04L 9/3297 |
| 2020/0259799 | A1* | 8/2020 | Li | H04L 9/0897 |
| 2021/0112038 | A1* | 4/2021 | Karame | G06N 3/08 |
| 2021/0119765 | A1* | 4/2021 | Jankly | H04L 63/0428 |
| 2021/0224404 | A1* | 7/2021 | Shrinivasan | H04L 63/0435 |
| 2021/0314161 | A1* | 10/2021 | Voit | H04L 9/0869 |
| 2021/0382831 | A1* | 12/2021 | Sun | H04L 9/0861 |
| 2021/0399983 | A1* | 12/2021 | Blatt | H04L 45/745 |

(Continued)

FOREIGN PATENT DOCUMENTS

CN 113111398 A 7/2021

OTHER PUBLICATIONS

Xiao et al.; "Privacy-Preserving Neural Network Inference Framework via Homomorphic Encryption and SGX", 2021, IEEE 41st International Conference on Distributed Computing Systems (ICDCS), pp. 751-761. (Year: 2021).*

(Continued)

*Primary Examiner* — Matthew Smithers
(74) *Attorney, Agent, or Firm* — Brown & Michaels, PC

(57) ABSTRACT

A new method for trusted data decryption is disclosed. A data user provides a public key Pk of an encryption key generation algorithm G. A data provider calculates an encryption key K based on an application A, a device C, and a token T by using G, encrypts a data set D by using K, encrypts G by using Pk to obtain Ge, and transmits ED and Ge to the data user. The data user can obtain a private key generation algorithm G' by using a locally stored private key Ps, and measures, in a trusted execution environment, the application A and the device C that request data to obtain MA' and CID', calculates an encryption key K' based on MA', CID' and a user-input token T by using G', and decrypts ED by using K'. If K'=K, the decryption succeeds, and data D is obtained; otherwise, the decryption fails.

10 Claims, 1 Drawing Sheet

(56) References Cited

U.S. PATENT DOCUMENTS

| | | | |
|---|---|---|---|
| 2022/0060319 A1* | 2/2022 | Patel | H04L 9/008 |
| 2022/0078186 A1* | 3/2022 | Gurel | G06F 21/44 |
| 2022/0094519 A1* | 3/2022 | Jeljeli | H04L 9/088 |
| 2022/0108026 A1* | 4/2022 | Ortiz | G06F 21/602 |
| 2022/0303256 A1* | 9/2022 | Sheth | G06F 21/72 |
| 2022/0321605 A1* | 10/2022 | Voit | H04L 63/20 |

OTHER PUBLICATIONS

Zhu et al., "Enabling Privacy-Preserving, Compute-and Data-Intensive Computing using Heterogeneous Trusted Execution Environment" 2019, arXiv:1904.04782, pp. 1-16. (Year: 2019).*

Cui et al., "Preserving Access Pattern Privacy in SGX-Assisted Encrypted Search" 2018, IEEE, pp. 1-9. (Year: 2018).*

* cited by examiner

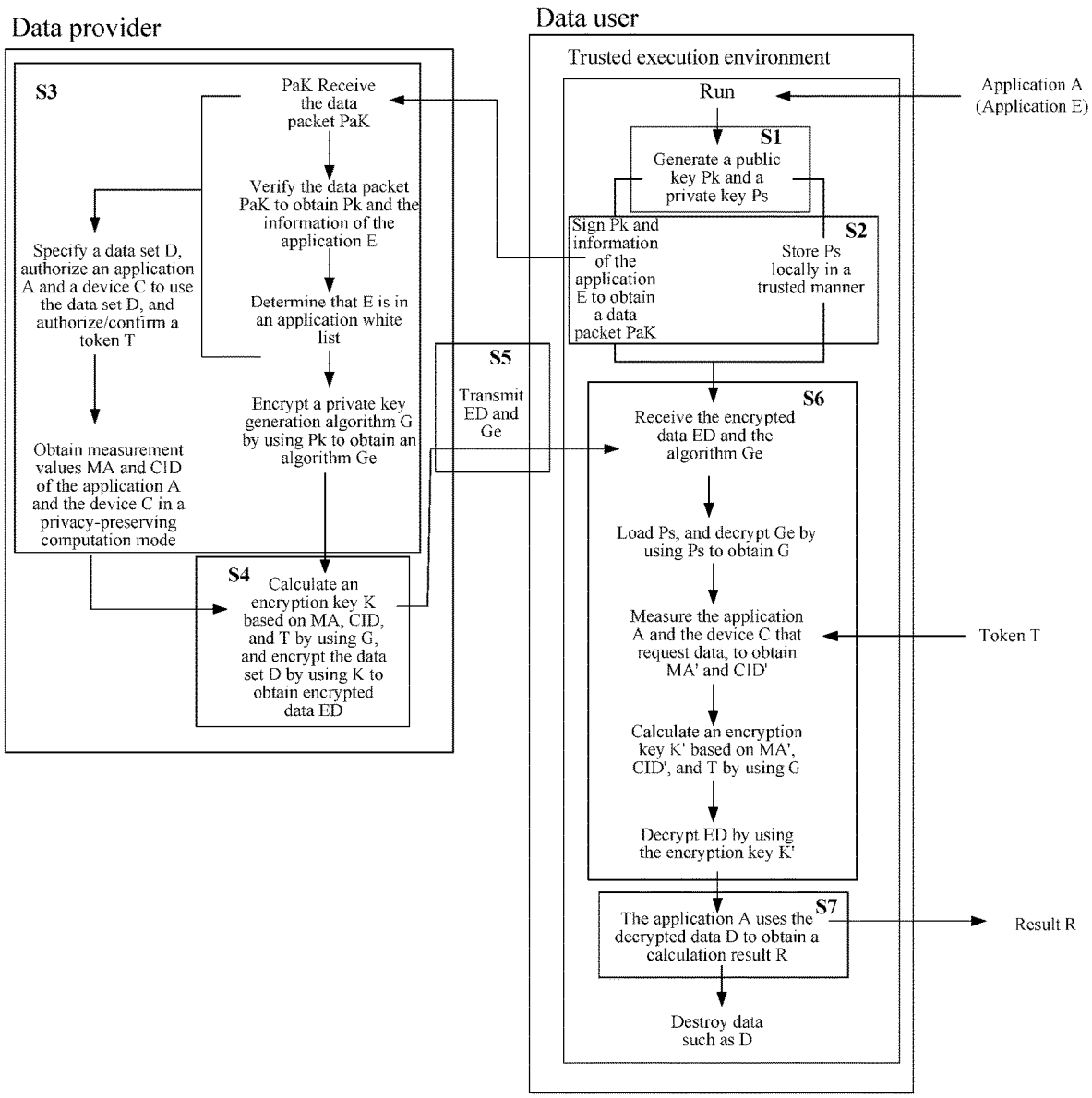

METHOD FOR TRUSTED DATA DECRYPTION BASED ON PRIVACY-PRESERVING COMPUTATION

CROSS REFERENCE TO RELATED APPLICATION

This patent application claims the benefit and priority of Chinese Patent Application No. 202210437790.4, filed with the China National Intellectual Property Administration on Apr. 25, 2022, the disclosure of which is incorporated by reference herein in its entirety as part of the present application.

TECHNICAL FIELD

The present disclosure relates to the technical field of data security, and in particular, to a new method for trusted data decryption based on privacy-preserving computation.

BACKGROUND

Data security is one of the most important research topics in computer and network disciplines. It is not only related to personal privacy and business privacy, but also directly affects national security.

From the perspective of data security, data without encryption is insecure and prone to leakage. However, encrypted data is not necessarily secure enough. Nowadays, data security incidents still occur from time to time even the encryption technology is commonly used. This is mainly due to the following reasons: 1) a data key is stolen, and thus data is decrypted and leaked illegally; 2) data is legally decrypted but then leaked; 3) a transmission path is not secure, leading to data leakage.

To solve the above problem, Chinese Patent Application No. CN113111398A discloses a method and device for storing data securely against illegal theft. The solution proposes to write encrypted data into volatile memory and decrypt the data by using a fixed key in the volatile memory, which helps an operator to delete the decrypted data in time, thereby avoiding leakage of the decrypted data, and improving the data security. However, the key stored in the volatile memory still is still at the risk of being leaked. The key can still be accessed by external software or a Kernel level of a hacker-controlled computer. Moreover, the decrypted data needs to be transmitted to a requesting party in this solution, and a transmission path is not secure enough; thus, there is still a high risk of leakage.

SUMMARY

An objective of the present disclosure is to provide a new method for trusted data. decryption based on privacy-preserving computation, to solve the foregoing problem.

In order to achieve the above-mentioned objective, the present disclosure employs the following technical solutions:

A new method for trusted data decryption based on privacy-preserving computation is provided, including the following steps:

S1: generating, by an application E of a data user, asymmetric encryption keys in a trusted execution environment, where the asymmetric encryption keys include a public key Pk and a private key Ps;

S2: making a digital signature on a measurement value of the application E and the public key Pk by using a chip-level private key of the user, to obtain a data packet PaK, storing the private key Ps locally in a trusted manner, and transmitting the data packet PaK to a data provider;

S3: verifying, by the data provider, the data packet PaK, obtaining the measurement value of the application E in the data packet PaK after the verification succeeds, determining whether the application E is in an application white list, and if yes, encrypting a private key generation algorithm G by using the public key Pk to obtain an algorithm Ge and continuing to perform the following steps; otherwise, ending the process;

where a data set D and an application A and/or a device C authorized to use the data set D are specified, and/or a token T is authorized/confirmed in advance or in this step.

S4: calculating, by the data provider, an encryption key K based on MA, and/or CID, and/or T by using the private key generation algorithm G, and encrypting the data set D by using the encryption key K to obtain encrypted data ED, where MA and CID are measurement values of the application A and the device C in a privacy-preserving computation mode respectively;

S5: transmitting, by the data provider, the encrypted data ED and the algorithm Ge to the data user;

S6: loading, by the data user, the private key Ps in the trusted execution environment, and decrypting the algorithm Ge by using the private key Ps to obtain a private key generation algorithm G';

where the application A and/or the device C that requests data is measured in the trusted execution environment to obtain MN and/or CID', an encryption key K is calculated based on MA' and/or CID' and/or a user-input token T by using the private key generation algorithm G', and the encrypted data ED is decrypted by using the encryption key K', if K'=K, the decryption succeeds, and the data D is obtained; otherwise, the decryption fails; and S7: using, by the application A, the data D in the trusted execution environment, and transmitting an obtained result R to the trusted execution environment, such that the result R is provided to the data user.

In the foregoing new method for trusted data decryption based on privacy-preserving computation, in step S3, the data provider verifies the digital signature of the data packet PaK based on a chip-level public key of the user, so as to verify whether PaK is generated by the user in a valid trusted execution environment.

In the foregoing new method for trusted data decryption based on privacy-preserving computation, in step S2, the measurement value of the application E is a memory measurement value of the application E in the trusted execution environment, and is obtained by measuring the application E in the trusted execution environment.

In the foregoing new method for trusted data decryption based on privacy-preserving computation, in step S2, the data packet PaK is transmitted to the data provider in an online manner, or transmitted to the data provider through a mobile memory device in an offline manner;

in step S5, the encrypted data ED and the algorithm Ge are transmitted to the data user in an online manner, or transmitted to the data user through a mobile memory device in an offline manner; and the token T is a password, a key or a credential, and is provided by the data user during decryption.

In the foregoing new method for trusted data decryption based on privacy-preserving computation, the measurement value of the application A is a memory measurement value MA of the application A in a privacy-preserving computation state in the trusted execution environment; or the measurement value of the application A is an identifier of an application provider or signature public key information of the application provider; and the measurement value of the device C is a device identifier CID of a CPU of the device C that is read in the privacy-preserving computation mode.

In the foregoing new method for trusted data decryption based on privacy-preserving computation, the application E is integrated in the application A; in step S6, when the data user needs to use data, the application A is started in the trusted execution environment to enter a privacy-preserving computation mode and loads the private key Ps for decrypting Ge to obtain the key generation algorithm G, thereby calculating the encryption key K' and decrypting the encrypted data ED; or the application E and the application A run in a trusted execution environment of a same host; in step S6, when the data user needs to use data, the application E is started in the trusted execution environment and triggers the application A to be started; the application E loads the private key Ps, decrypts the key generation algorithm G, calculates the encryption key K' based on MA' and CID' that are obtained through measurement in a privacy-preserving computation environment of the application A as well as a token T inputted by the data provider, and transmits the encryption key K' to the application A in a trusted manner; and the application A decrypts the encrypted data ED so as to use the data D.

In the foregoing new method for trusted data decryption based on privacy-preserving computation, the application E and the application A run in trusted execution environments of different hosts; in step S6, when the data user needs to use data, the application E is started in the trusted execution environment of a computing device in which the application E is located, remotely triggers the application A to be started in the trusted execution environment of a computing device in which the application A is located, and directly performs calculation and signing in the trusted execution environment based on a chip to check whether the application A runs in a valid trusted execution environment; and a secure encryption transmission channel between encrypted memory blocks of the application E and the application A is established based on the validity check.

In the foregoing new method for trusted data decryption based on privacy-preserving computation, a CPU of the computing device running the application A measures the application A in the trusted execution environment to obtain the measurement value MA', reads a device identifier CID', and transmits MA and CID' to the application E through the secure encryption transmission channel after a chip signature is made in a privacy-preserving computation trusted environment; the application E loads the private key Ps based on the trusted storage technology to decrypt the algorithm Ge to obtain the private key generation algorithm G', calculates the encryption key K' based on MA', CID' and the token T by using the private key generation algorithm G' after checking that MA' and CID' are valid, and then transmits the encryption key K' to the application A running in the trusted execution environment through the secure encryption transmission channel; and the application A decrypts the data ED to obtain the data D.

In the foregoing new method for trusted data decryption based on privacy-preserving computation, in step S3, the data provider also encrypts a provider private key Ss by using the public key Pk to generate Se;

in step S5, the data provider also transmits Se to the data user;

in step S6, the data user also decrypts Se by using the private key Ps to obtain Ss; and in step S7, when the application A finishes running or is about to finish running, the application A signs a computational state comprising any one or more of a result hash value, user information, a signature timestamp, MA', a CID' hash value, or a D hash value by using Ss to generate Sig, and transmits Sig to the data provider in an online or offline manner synchronously or asynchronously.

In the foregoing new method for trusted data decryption based on privacy-preserving computation, after step S7, the method further includes:

upon receiving a write-into-disk storage request from the data user, writing, in an encrypted manner by using the key K', data D2 that needs to be written into a disk, and repeating step S6 and S7 when using the data D2 next time.

The present disclosure has the following advantages:

1. The encrypted data can only be legally decrypted in a trusted execution environment, and the data will be destroyed immediately after the application finishes using the data, thus avoiding data leakage due to that the data is legally decrypted but not deleted in time.

2. The present disclosure provides a solution for implementing data encryption and decryption without saving or transmitting a decryption key of encrypted data, thus avoiding the problem that leaked data is decrypted due to improper storage of the data key. The data will not be leaked even if the transmission path is insecure.

3. The generation of the decryption key further depends on a series of information parameters, e.g., how and where and by whom the data is used. Unlike a traditional data provider that loses control over data once the data is shared, the data provider in the present disclosure is no longer a mere provider, but can control how and where the data is used while providing the data, thereby greatly enhancing the security of data decryption and usage.

4. Based on the verification of sig data, information of where, when, and by whom the data is used in a trusted environment can be tracked in real time to protect privacy under the premise of legal and secure use.

BRIEF DESCRIPTION OF THE DRAWINGS

FIG. 1 is a flowchart of a new method for trusted data decryption based on privacy-preserving computation according to the present disclosure.

DETAILED DESCRIPTION OF THE EMBODIMENTS

The present disclosure will be further described in detail below with reference to the accompanying drawings and embodiments.

CPU-level confidential computation or privacy-preserving computation, as one of the most cutting-edge technologies in the field of information security that has emerged in recent years, refers to computation in a chip-level trusted execution environment, which is not controlled by a system layer or kernel layer. Encrypted data is only decrypted in a CPU-level trusted execution environment and supports computation. The relevant data in the trusted execution environment is destroyed after the computation is finished. The decrypted plaintext data will not be leaked throughout the process, thus ensuring high privacy of the data in the trusted execution environment. The data-based computation is performed in the trusted execution environment, and no one (including a person with the highest authority to run the host or an owner of the system Kernel level control) can tamper with the computation in the CPU-level trusted execution environment, thus ensuring the computation trustworthiness in the trusted execution environment. Currently, the corresponding technologies include Intel SGX, AMD SEV, etc. Technologies related to the chip-level hardware security environment have been widely used in general-purpose chips and integrated in general-purpose computers and servers, such as the current Intel i3, i5, i7 notebooks and PCs, servers Xeon, etc.

The present disclosure takes advantage of the reliability of the trusted execution environment and proposes a new method for trusted data decryption based on a trusted execution environment. In the method, the encrypted data can only be legally decrypted in a trusted execution environment, and the data will be destroyed immediately after the application finishes using the data, thus avoiding data leakage due to that the data is legally decrypted but not deleted in time. In addition, the present disclosure further proposes an idea of not saving or transmitting a decryption key of encrypted data, and provides a feasible solution for implementing data encryption and decryption without saving or transmitting the decryption key of the encrypted data. Therefore, the present disclosure avoids the problem that leaked data is decrypted due to improper storage of the data key. The data will not be leaked even if the transmission path is insecure. Moreover, in the present disclosure, unlike a traditional data provider that loses control over data once the data is shared, the data provider in the present disclosure is no longer a mere provider, but can control how and Where the data is used while providing the data, thereby greatly enhancing the security of data decryption and usage.

As shown in FIG. 1, the present disclosure is implemented as follows:

S1: An application E of a data user generates asymmetric encryption keys in a trusted execution environment, where the asymmetric encryption keys include a public key Pk and a private key Ps.

S2: Make a digital signature makes a digital signature on the public key Pk and a memory measurement value of the application F by using a chip-level private key (a private key in an underlay security zone of the chip) of the user to obtain a data packet PaK; the user stores the private key Ps locally in a trusted manner based on a trusted storage technology, and transmits the data packet PaK to a data provider, where the data packet PaK is transmitted to the data provider in an online manner, or transmitted to the data provider through a mobile memory device in an offline manner. In addition, those skilled in the art should understand that the trusted storage technology (such as Intel SGXSealing) ensures that the private key Ps is only allowed to be loaded and used in the trusted execution environment, and even a person with the highest authority over the computer cannot obtain the private key Ps.

The measurement value of the application E is a memory measurement value of the application E in the trusted execution environment, and is obtained by measuring the application E in the trusted execution environment.

S3: The data provider has an application white list; when receiving the data packet PaK, the data provider verifies the digital signature of the data packet PaK based on the chip-level public key of the user to verify whether PaK is generated by the user in a valid trusted execution environment; after the verification succeeds, the data provider obtains the measurement value of the application E in the data packet PaK, determine whether the measurement value corresponding to the application E is in the application white list; if yes, the data provider uses the public key Pk in the data packet to encrypt a private key generation algorithm G to obtain an algorithm Ge and continues to perform the following steps; otherwise, the data provider ends the process, where a data set D and an application A and/or a device C authorized to use the data set D are specified, and/or a token T is authorized/confirmed in advance or in this step, and the token T may be a password, a key or a credential, and is provided by the data. user during decryption.

S4: The data provider calculates an encryption key K based on MA, CID, and T by using the private key generation algorithm G, and encrypts the data set D by using the encryption key K to obtain encrypted data ED, where MA and CID are measurement values of the application A and the device C in a privacy-preserving computation trusted environment mode respectively.

The data provider authorizes a device identifier CID, which is read in a privacy-preserving computation trusted environment, of a computing device of a related data user, for example, a Platform ID in an Intel SGX privacy-preserving computation mode.

The data provider runs in advance in the trusted execution environment to obtain the memory measurement value MA of the application A. For example, a measurement value for an application in a privacy-preserving computation-based Intel SGX technology is MREnclave, and when the privacy-preserving computation mode is enabled, a CPU sends an instruction to load the application A to encrypted memory and measure this value. MA may be considered as a trusted identifier of the application A in the privacy-preserving computation mode. Alternatively, the measurement value of the application A may be an identifier of an application provider or signature public key information of the application provider.

S5: The data provider transmits the encrypted data ED and the algorithm Ge to the data user, where similarly, the encrypted data ED and the algorithm Ge are transmitted to the data user in an online manner, or transmitted to the data user through a mobile memory device in an offline manner.

S6: The data user loads the private key Ps in the trusted execution environment based on the trusted storage technology, and decrypts the algorithm Ge by using the private key Ps to obtain a private key generation algorithm G'.

A memory measurement value MN of the application A that requests data and a device identifier CID' of the device C that requests data are measured in the trusted execution environment; an encryption key K' is calculated based on MA', CID' and a user-input token T by using the private key generation algorithm G', and the encrypted data ED is decrypted by using the encryption key K'; if K'=K, the decryption succeeds, and the data D is obtained; otherwise, the decryption fails.

S7: The application A uses the data. D in the trusted execution environment, and transmits an obtained result R to the trusted execution environment, such that the result R is provided to the data user.

The data user calculates the encryption key K based on MA, T, and CID by using the private key generation algorithm G, and the provider calculates the encryption key K' based on MA', T' and CID' by using the private key generation algorithm G. During practical use, the data provider may also calculate the encryption key K based on MA, T, and CID, and the encryption K' based on MA', T' and CID' by using a chip-level extended instruction set, for example, extended hardware instructions integrated in hardware.

The foregoing process can be simplified as the following formulas:

Data provider: MA+CID+T+G=K, Pk+G=Ge, K+D=ED

Data user: the user provider obtains Ge and ED, and has Ps (extracted based on the trusted storage technology); Ge+Ps=G', MA'+CID'+T+G'=K', and if MA'==MA, CID'==CID, T==T, and G'==G, then K'==K; if K'==K, then ED+K'=D.

Specifically, in an implementation manner, the application E is integrated in the application A; in step S6, when the data user needs to use data, the application A is started in the trusted execution environment to enter a privacy-preserving computation mode. The application A directly triggers the CPU to measure MA' and CID' when started in the privacy-preserving computation mode. The application A loads the private key Ps to decrypt the algorithm G, calculates the encryption key K' based on MA' and CID' of the application A measured in the privacy-preserving computation environment as well as the token T inputted by the data provider, and decrypts the encrypted data ED.

In another implementation manner, the application E and the application A are different applications running in a trusted execution environment of a same host; in step S6, when the data user needs to use data, the application F is started in the trusted execution environment and triggers the application A to be started; the application E loads the private key Ps, decrypts the key generation algorithm G; measured MA' and CID' of the application A and the token T' inputted by the data provider are transmitted to the application E through a trusted connection (for example, the trusted connection is established based on Intel SGX Local attestation). The application E calculates the encryption key K' based on G', and transmits the encryption key K' to the application A based on the trusted connection. The application A decrypts the encrypted data ED) so as to use the data D.

In another implementation manner, the application E and the application A run in trusted execution environments of different hosts; in step S6, when the data user needs to use data, the application E is started in the trusted execution environment of a computing device in which the application E is located, remotely triggers the application A to be started in the trusted execution environment of a computing device in which the application A is located, and directly performs calculation and signing in the trusted execution environment based on a chip (for example, based on the SGX Remote-Attestation process) to check whether the application A runs in a valid trusted execution environment; and a secure encryption transmission channel between encrypted memory blocks of the application E and the application A is established based on the validity check by using, for example, an Intel SGX RA-TLS technology.

The application E triggers a CPU of the computing device running the application A to measure the application A in the trusted execution environment to obtain the measurement value MA', reads a CPU device identifier CID', and transmits MA' and CID' to the application E through the secure encryption transmission channel after a chip signature is made in a privacy-preserving computation trusted environment; the application E loads the private key Ps to decrypt the algorithm Ge to obtain the private key generation algorithm G', calculates the encryption key K' based on MA', CID' and the token T by using the private key generation algorithm G' after checking that MA' and CID' are valid, and then transmits the encryption key K' to the application A running in the trusted execution environment through the secure encryption transmission channel; and the application A decrypts the data ED to obtain the data D.

In such a manner, the application E may be deployed in the data user or data provider.

Further, after step S7, the method further includes:

upon receiving a write-into-disk storage request from a data user, writing data D2 into a disk in an encrypted manner by using the key K', where D2 may be all or part of D, D and other private data, or other private data, and steps S6 and S7 are repeated in next use. The user can directly decrypt and use the data next time, without obtaining the data from the provider again, thereby improving data sharing efficiency while ensuring data security.

Preferably, in this method, the data provider also encrypts a provider private key Ss by using the public key PK to obtain Se, and the data provider also transmits Se to the data user. The data user decrypts Se by using the private key Ps to obtain Ss. When the application A finishes running or is about to finish running, the application A signs a computational state including any one or more of a result hash value, user information, a signature timestamp, MA', a CID' hash value, or a D hash value by using Ss to generate Sig in the trusted execution environment, and transmits Sig to the data provider in an online or offline manner synchronously or asynchronously. The data provider can verify in a trusted manner information of where, when, and by whom the data D is used in a trusted environment legally and securely under the premise of privacy protection.

Optionally, when started in the trusted execution environment, the application E can establish a trusted connection to the data provider through remote attestation of privacy-preserving computation, e.g., based on an Intel SGX Remote attestation mechanism. After the connection succeeds, the data provider provides a MA, T, and CID white list or black list to the application E. When the data user sends a data disclosure request to the application E, the application E may verify in advance whether the obtained MA', CID', T' are valid before generating a key, e.g., whether the obtained MA', CID', T' are on the white list or not on the black list; if they are valid, a decryption key K' is generated to decrypt data to be used; otherwise, an operation of generating a decryption key will not be triggered.

The data user does not get the data provided by the provider or the key K' for data decryption throughout the foregoing process (because such private data are run in a privacy-preserving computation trusted environment), but obtains a required result. Therefore, the foregoing method can provide a data service for the data user while protecting the data security. Moreover, in the foregoing process, the key K used by the data provider for data encryption is related to measurement values of the application A and the device C during running in the trusted execution environment (even a data user with the highest authority cannot view or tamper with these measurement values in a privacy-preserving computation environment). Similarly, when calculating the key the data user needs to use measurement values MA' and CID' of the application A and the device C that requests data in the trusted execution environment. Only when the application A that requests data is a specified application, the device C running the application A is a specified device, and the user has a correct token T, can the data be used (the data user cannot hack into the privacy-preserving computation trusted environment to view or tamper with the related measurement values and keys), That is, the data provider can control where (consistent device C), how (the application A is consistent), and by whom (the token is consistent) the data is used. Therefore, the data provider can ensure secure use of the data.

The specific embodiments described herein are merely intended to illustrate the spirit of the present disclosure by way of example. A person skilled in the art can make various modifications or supplements to the specific embodiments described or replace them in a similar manner, but it may not depart from the spirit of the present disclosure or the scope defined by the appended claims.

What is claimed is:

1. A new method for trusted data decryption based on privacy-preserving computation, comprising the following steps:
S1: generating, by an application E of a data user, asymmetric encryption keys in a trusted execution environment, wherein the asymmetric encryption keys comprise a public key Pk and a private key Ps;
S2: making a digital signature on a measurement value of the application E and the public key Pk by using a chip-level private key of the user, to obtain a data packet PaK, storing the private key Ps locally in a trusted manner, and transmitting the data packet PaK to a data provider;
S3: verifying, by the data provider, the data packet PaK, obtaining the measurement value of the application E in the data packet PaK after the verification succeeds, determining whether the application E is in an application white list, and if yes, encrypting a private key generation algorithm G by using the public key Pk to obtain an algorithm Ge and continuing to perform the following steps; otherwise, ending the process;
wherein a data set D and an application A and/or a device C authorized to use the data set D are specified, and/or a token T is authorized/confirmed in advance or in this step;
S4: calculating, by the data provider, an encryption key K based on MA, CID, and T by using the private key generation algorithm G, and encrypting the data set D by using the encryption key K to obtain encrypted data ED, wherein MA and CID are measurement values of the application A and the device C in a privacy-preserving computation mode respectively;
S5: transmitting, by the data provider, the encrypted data ED and the algorithm Ge to the data user;
S6: loading, by the data user, the private key Ps in the trusted execution environment, and decrypting the algorithm Ge by using the private key Ps to obtain a private key generation algorithm G';
wherein the application A and the device C that requests data is measured in the trusted execution environment to obtain MA' and CID', an encryption key K' is calculated based on MA', and/or CID' and/or a user-input token T by using the private key generation algorithm G', and the encrypted data ED is decrypted by using the encryption key K'; if K'=K, the decryption succeeds, and the data D is obtained; otherwise, the decryption fails; and
S7: using, by the application A, the data D in the trusted execution environment, and transmitting an obtained result R to the trusted execution environment, such that the result R is provided to the data user.

2. The new method for trusted data decryption based on privacy-preserving computation according to claim 1, wherein in step S3, the data provider verifies the digital signature of the data packet PaK based on a chip-level public key of the user, so as to verify whether PaK is generated by the user in a valid trusted execution environment.

3. The new method for trusted data decryption based on privacy-preserving computation according to claim 2, wherein in step S2, the measurement value of the application E is a memory measurement value of the application E in the trusted execution environment, and is obtained by measuring the application E in the trusted execution environment.

4. The new method for trusted data decryption based on privacy-preserving computation according to claim 3, wherein in step S2, the data packet PaK is transmitted to the data provider in an online manner, or transmitted to the data provider through a mobile memory device in an offline manner;
in step S5, the encrypted data ED and the algorithm Ge are transmitted to the data user in an online manner, or transmitted to the data user through a mobile memory device in an offline manner; and
the token T is a password, a key or a credential, and is provided by the data user during decryption.

5. The new method for trusted data decryption based on privacy-preserving computation according to claim 3, wherein the measurement value of the application A is a memory measurement value MA of the application A in a privacy-preserving computation state in the trusted execution environment; or the measurement value of the application A is an identifier of an application provider or signature public key information of the application provider; and the measurement value of the device C is a device identifier CID of a CPU of the device C that is read in the privacy-preserving computation mode.

6. The new method for trusted data decryption based on privacy-preserving computation according to claim 1, wherein the application E is integrated in the application A; in step S6, when the data user needs to use data, the application A is started in the trusted execution environment to enter a privacy-preserving computation mode and loads the private key Ps for decrypting Ge to obtain the key generation algorithm G', thereby calculating the encryption key K' and decrypting the encrypted data ED; or the application E and the application A run in a trusted execution environment of a same host; in step S6, when the data user needs to use data, the application E is started in the trusted execution environment and triggers the application A to be started; the application E loads the private key Ps for decrypting Ge to obtain the key generation algorithm G', calculates the encryption key K', and transmits the encryption key K' to the application A through an encrypted connection; and the application A decrypts the encrypted data ED so as to use the data D.

7. The new method for trusted data decryption based on privacy-preserving computation according to claim 1, wherein the application E and the application A run in trusted execution environments of different hosts; in step S6, when the data user needs to use data, the application E is started in the trusted execution environment of a computing device in which the application E is located, remotely triggers the application A to be started in the trusted execution environment of a computing device in which the application A is located, and directly performs calculation and signing in the trusted execution environment based on a chip to check whether the application A runs in a valid trusted execution environment; and a secure encryption transmission channel between encrypted memory blocks of the application E and the application A is established based on the validity check.

8. The new method for trusted data decryption based on privacy-preserving computation according to claim 7, wherein a CPU of the computing device running the application A measures the application A in the trusted execution environment to obtain the measurement value MA', reads a device identifier CID', and transmits MA' and CID' to the application E through the secure encryption transmission channel after a chip signature is made in a privacy-preserving computation trusted environment; the application E loads the private key Ps to decrypt the algorithm Ge to obtain the private key generation algorithm G', calculates the encryption key K' based on MA', CID' and the token T by using the private key generation algorithm G' after checking that MA' and CID' are valid, and then transmits the encryption key K' to the application A running in the trusted execution environment through the secure encryption transmission channel; and the application A decrypts the data ED to obtain the data D.

9. The new method for trusted data decryption based on privacy-preserving computation according to claim 1, wherein in step S3, the data provider also encrypts a provider private key Ss by using the public key Pk to generate Se;

in step S5, the data provider also transmits Se to the data user;

in step S6, the data user also decrypts Se by using the private key Ps to obtain Ss; and in step S7, when the application A finishes running or is about to finish running, the application A signs a computational state comprising any one or more of a result hash value, user information, a signature timestamp, MA', a CID' hash value, or a D hash value by using Ss to generate Sig, and transmits Sig to the data provider in an online or offline manner synchronously or asynchronously.

10. The new method for trusted data decryption based on privacy-preserving computation according to claim 9, after step S7, further comprising: upon receiving a write-into-disk storage request from the data user, writing, in an encrypted manner by using the key K', data D2 that needs to be written into a disk, and repeating step S6 and S7 when using the data D2 next time.

* * * * *